United States Patent
Le Neindre et al.

(10) Patent No.: US 8,109,855 B2
(45) Date of Patent: Feb. 7, 2012

(54) METHOD FOR CONTROLLING THE COUPLING AND THE DECOUPLING OF THE FIRST MOTOR AND SECOND MOTOR OF A PARALLEL HYBRID MOTIVE POWER GROUP

(75) Inventors: Yvan Le Neindre, Paris (FR); Gaetan Rocq, La Boissiere-Ecole (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1081 days.

(21) Appl. No.: 11/993,854

(22) PCT Filed: Jun. 23, 2006

(86) PCT No.: PCT/FR2006/050629
§ 371 (c)(1),
(2), (4) Date: Dec. 21, 2007

(87) PCT Pub. No.: WO2007/000555
PCT Pub. Date: Jan. 4, 2007

(65) Prior Publication Data
US 2010/0167870 A1    Jul. 1, 2010

(30) Foreign Application Priority Data
Jun. 27, 2005   (FR) ..................... 05 06514

(51) Int. Cl.
*B60W 10/02* (2006.01)
*B60W 10/08* (2006.01)
(52) U.S. Cl. .............................. 477/5; 701/67
(58) Field of Classification Search .............. 477/2, 3, 477/5; 701/22, 67, 68
See application file for complete search history.

(56) References Cited

U.S. PATENT DOCUMENTS

| | | |
|---|---|---|
| 5,735,770 A | 4/1998 | Omote et al. |
| 2002/0117339 A1 | 8/2002 | Nakashima |
| 2003/0109357 A1 | 6/2003 | Tabata |

OTHER PUBLICATIONS

International Search Report mailed Apr. 5, 2007 in PCT/FR2006/050629.

*Primary Examiner* — J. Allen Shriver, II
*Assistant Examiner* — Jacob Meyer
(74) *Attorney, Agent, or Firm* — Nicolas E. Seckel

(57) ABSTRACT

The invention relates to a method for controlling the coupling and the decoupling of the first motor and of the second motor of a parallel hybrid motive power group comprising a first motor (11) driving an input shaft (4) at the entrance of a gear box (15), a second motor (12) and a coupling/decoupling means (13) of the second motor and of the first motor, maneuverable between an open position and a closed position, for enabling a change with regard to the gearbox when the motor group operates in hybrid mode, according to which the motive power group is controlled for decoupling the second motor and the first motor then changing the ratio of the gear box, and recoupling the second motor and the first motor. The laws of control of the motor group are used in such a manner that during the coupling and the decoupling, the torque set value for the input shaft comprises a discontinuity selected for compensating for the difference between the inertia produced by the input shaft when the second motor is coupled to the first motor and the inertia driven by the first input shaft when the second motor is decoupled from the first motor in order to avoid any sudden variation in acceleration of the input shaft driven by the motor group at the moment of decoupling or coupling.

9 Claims, 3 Drawing Sheets

Figure 1:
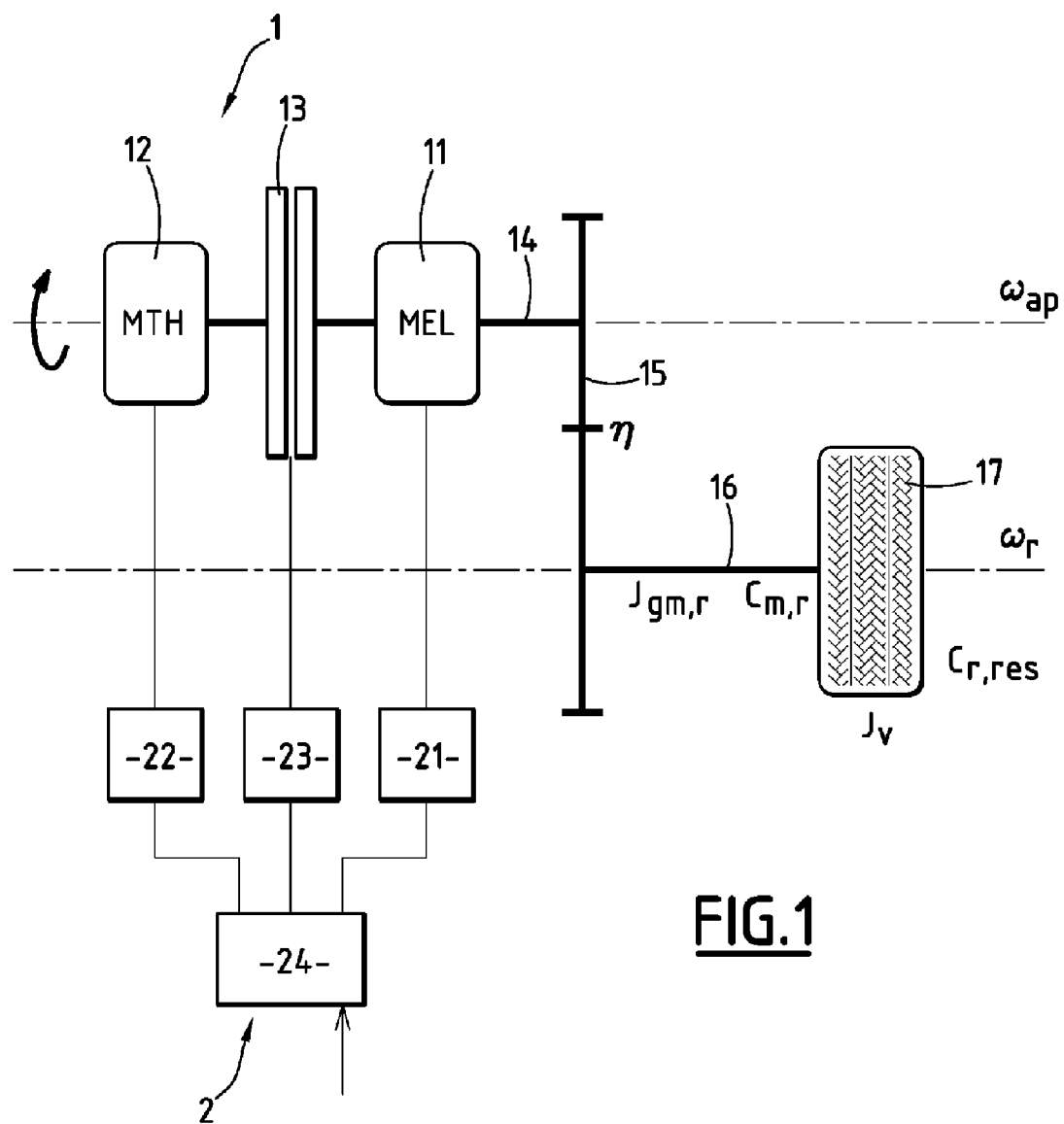

METHOD FOR CONTROLLING THE COUPLING AND THE DECOUPLING OF THE FIRST MOTOR AND SECOND MOTOR OF A PARALLEL HYBRID MOTIVE POWER GROUP

The present invention relates to a method for controlling the coupling and decoupling of the first motor and the second motor of a parallel hybrid drive train of the type that includes a first motor that drives a main input shaft of a gearbox, a second motor, and a coupling/decoupling means for the second motor and the first motor, maneuverable between an open position and a closed position to make it possible to change the gearbox ratio when the drive train is operating in hybrid mode.

Motor vehicles equipped with parallel hybrid drive trains are known. Parallel hybrid drive trains are drive trains that include a first motor that is generally electric and a second motor that is generally a heat engine, that can be coupled or decoupled via a controlled clutch so as to continuously optimize the use of the various energies available.

Depending on the vehicle operating conditions, the electric motor is used either alone or coupled with the heat engine, in which case the electric motor can operate in energy collection mode.

The connection/disconnection (or coupling/decoupling) of the heat engine and the electric motor is achieved using the controlled clutch. This assembly is controlled by control units, or more generally, computer systems dedicated to each of the components—heat engine, clutch, and electric motor—supervised by a main computer that determines the optimal operating mode of the drive train according to the vehicle operating conditions.

In addition, the supervising computer regularly gives instructions to change the gearbox ratio. Actually, for such drive trains, continuously optimizing the use of various energy sources results in changing the gearbox ratio very frequently.

In order to carry out the gearbox ratio changes, the supervising computer gives the necessary instructions to the drive train so that the gearbox ratio can be changed in the best conditions.

In particular, changing the gearbox ratio entails three phases: a first phase during which the torque transmitted to the gearbox is reduced to zero, which is the cancellation phase; then a synchronization phase during which the ratio of the gearbox is changed; then a third, so-called re-engagement phase, which is a phase during which the drive unit once again begins to send power to drive the wheels of the vehicle.

In order to comply with longitudinal comfort constraints, e.g. to prevent irregularities in the vehicle's speed or acceleration, the time during which there is no torque at the wheel (this is the time during which the torque is canceled), which corresponds to the speed-synchronization phase, must be minimized. However, the inertia of the motors is very high, particularly that of the heat engine, and this inertia does not in theory make it possible to comply with user-requested synchronization times. This incompatibility arises primarily when the drive unit is operating in hybrid mode—i.e., when the heat engine and the electric motor are coupled—, in particular because the inertia of the heat engine is very high.

To be able to change a gear ratio in satisfactory conditions, when the drive unit is operating in hybrid mode, the heat engine must be decoupled from the electric motor during the cancellation phase, then recoupled during the re-engagement phase. However, the control setpoints used for coupling and decoupling the two motors during periods when the gearbox ratio is changing generate irregular longitudinal variations in vehicle acceleration or speed, causing discomfort to the passengers.

The purpose of the present invention is to remedy this difficulty by proposing a means for controlling the decoupling and the coupling of the heat engine and electric motor of a motor vehicle hybrid drive unit during the ratio change of a gearbox with the engine operating in hybrid mode that results in smooth longitudinal operation of the vehicle.

To this end, the object of the invention is a method for controlling the coupling and decoupling of the first motor and the second motor of a parallel hybrid drive train of the type comprising a first motor that drives a main input shaft of a gearbox, a second motor, and a coupling/decoupling means for the second motor and the first motor, maneuverable between an open position and a closed position to make it possible to change the gearbox ratio when the drive train is operating in hybrid mode, according to which the drive train is controlled so as to decouple the second motor and the first motor, then to change the gearbox ratio, and to recouple the second motor and the first motor, using control laws for the drive unit such that during coupling and decoupling, the torque setpoint for the main shaft has a discontinuity selected so as to offset the difference between the inertia carried by the main shaft when the second motor is coupled to the first motor and the inertia carried by the main shaft when the second motor is decoupled from the first motor in order to prevent any abrupt variation in acceleration of the main shaft driven by the drive unit at the moment of decoupling or coupling.

By preference, a reference torque setpoint is defined for the drive unit, to be sent to the main shaft when the two motors are coupled, as well as a reference torque setpoint to be sent to the main shaft when the two motors are decoupled; based on the resisting torque to which the main shaft is subjected and the inertias it must carry when the motors are coupled and decoupled, a natural deceleration torque is defined for the drive unit when the motors are coupled, as well as a natural deceleration torque when the motors are decoupled. A first transition law is defined to govern the transition, for coupling, from the reference torque to transmit to the main shaft when the motors are coupled to the natural deceleration torque when the motors are coupled, and the reverse for decoupling; a second law is defined to govern the transition, for coupling, from the reference torque to transmit to the main shaft when the motors are decoupled to the natural deceleration torque when the motors are decoupled, and the reverse for decoupling; and during coupling or decoupling, the drive unit is controlled so as to transmit to the main shaft a torque consistent with the transition law that corresponds to the initial operating mode of the drive unit, up to the moment when the operating mode of the drive unit changes, and then the drive unit is controlled so as to transmit to the main shaft a torque following the transition law that corresponds to the target operating mode of the drive unit.

By preference, for decoupling, the moment the drive unit changes operating modes is when the coupling/decoupling means finishes opening, and for coupling, the moment the drive unit changes operating modes is when the coupling/decoupling means finishes closing.

By preference, the first motor is controlled continuously for torque; the second motor is controlled for torque when it is coupled, and controlled for speed when it is decoupled or in the process of coupling; and the coupling/decoupling means is controlled for torque so that the torque transmitted to the main shaft—which is equal to the sum of the torque of the first motor and the maximum torque transmittable by the coupling/decoupling means, when the second motor is not coupled, or the torque of the second motor, when the second motor is coupled—is equal at each instant to the torque setpoint for the main shaft defined for the transition from coupled to decoupled, or vice versa.

Preferably, for decoupling, during a first period in which the two motors are coupled, the torque setpoint of the first motor is reduced to the value of the natural deceleration torque when the motors are decoupled; then the torque setpoint for the first motor is maintained, and the coupling/decoupling means begins to open; the coupling/decoupling means is opened while the second motor is controlled so that the torque transmitted to the main shaft follows the law corresponding to the motor-coupling process.

Preferably, for coupling, the torque setpoint of the first motor is maintained, and the coupling/decoupling means begins to close and it closes gradually; simultaneously, the second motor is controlled for speed to make the coupling/decoupling means synchronize tangentially, and as soon as the tangential synchronization occurs, the torque setpoint for the main shaft is switched from following the law for the decoupled motors to the law for the coupled motors, and the control mode for the second motor is switched from speed-control mode to torque-control mode.

For example, the first motor is an electrical machine, the second motor is a heat engine, and the coupling/decoupling means is a controlled clutch.

The drive unit is a hybrid drive train of a motor vehicle, for example.

The invention also concerns a hybrid drive train including a first motor, a second motor and a coupling/decoupling means having a control means that implements the method according to the invention. This drive train drives the gearbox of an automobile, for example.

Figure 2:
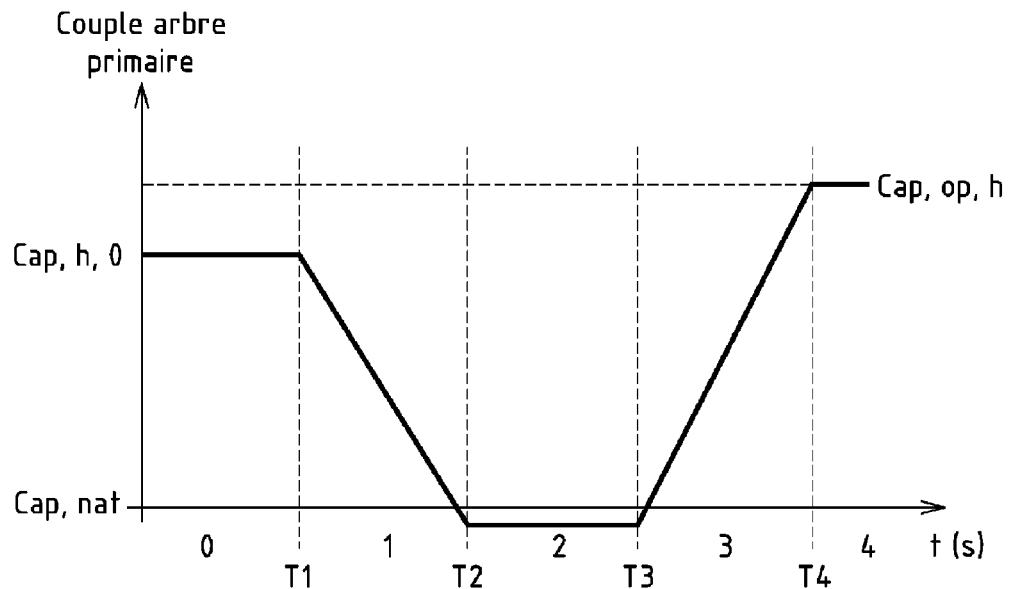
Figure 3:
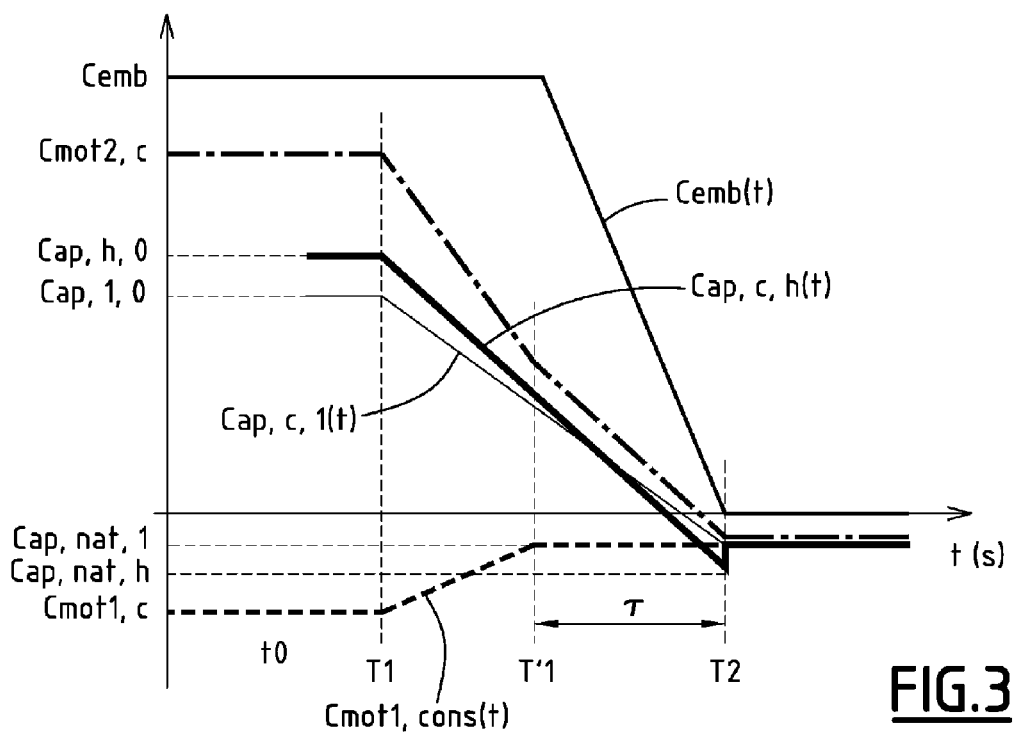
Figure 4:
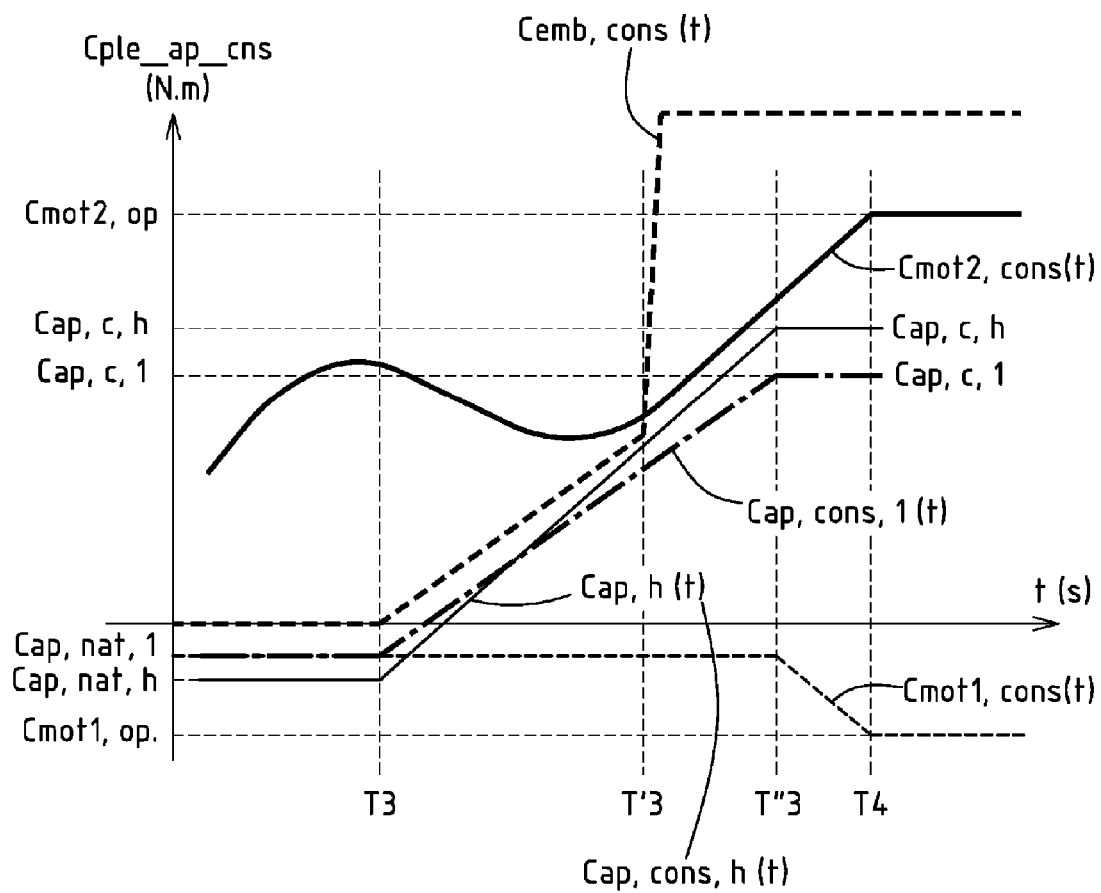

The invention will now be described more precisely, but not exhaustively, with reference to the annexed figures, in which:

FIG. 1 schematically represents a parallel-mode simple hybrid fraction drive for the wheel of a motor vehicle;

FIG. 2 schematically represents the progression over time in the torque transmitted to the wheel during a gearbox ratio change;

FIG. 3 schematically represents the control laws used to control the drive unit during the first phase of the gearbox ratio change, i.e., to govern the decoupling of the two motors of the hybrid drive unit; and FIG. 4 is a schematic representation of the control law used to control the drive unit during the re-engagement phase of the gearbox ratio change, i.e., to govern the re-coupling of the two motors of the hybrid drive unit.

First we will describe the hybrid fraction drive represented in FIG. 1. This hybrid traction drive includes a drive train, generally referenced 1, made up of a first motor 11, which is an electric motor, or more generally, an electrical machine that can operate as a generator as well as a motor, and a second motor 12, which is a heat engine, with the two motors—electric and heat engine—able to be coupled via a coupling/decoupling means 13, which is generally a controlled clutch.

This drive train is controlled by a control means, generally referenced 2, made up of a local computer 21 for controlling the first motor 11, a second local computer 22 for controlling the second motor 12, a third local computer 23 for controlling the coupling/decoupling means 13, and a supervising computer 24 responsible for giving instructions to the local computers 21, 22 and 23, derived from data relating to vehicle operation and the wishes of the driver.

The computer 24 receives information and instructions from various sensors located on the vehicle, in a manner known in itself to the person skilled in the art.

The drive train 1 drives a main shaft 14, which is the input shaft of a gearbox 15, which drives an output shaft 16, which drives at least one wheel 17 of the vehicle.

In operation, the wheel 17 is subjected to a resisting torque as well as a motor torque, which is the drive torque of the gearbox output shaft 16, in such a way that the acceleration of the mechanical assembly is equal to the ratio of the difference between the motor torque and the resisting torque divided by the moment of inertia seen by the mechanical system, i.e., divided by the sum of the moments of inertia of the driven masses with respect to the axle 16.

The operation of the vehicle can also be represented using the inertias seen by the main input shaft 14 of the gearbox as a reference. This main shaft sees a resisting torque Cap,res, and the vehicle drive inertia Jap,v; in addition, it sees inertias due to the inertias of the drive unit Jap,m. This inertia corresponds to the drive unit depends on the engine operating mode, whether it is operating in hybrid mode, where the first motor and the second motor are coupled, or operating in electric-only mode, where only the first motor—i.e., the electric motor—is coupled to the main shaft. This operating mode corresponds, in fact, to the situation in which the second motor—i.e., the heat engine—is decoupled from the first motor. If Jm1 is the inertia of the first motor and Jm2 is the inertia of the second motor, then when the drive unit is operating in hybrid mode, the inertia of the motors seen by the main shaft is Jap,m=Jm1+Jm2 and when the motors are decoupled, this inertia is simply Jap,m=Jm1.

The drive torque of the various elements located on the main shaft 14 also depends on the operating mode of the drive unit.

In all cases, the main shaft 14 receives a motor torque corresponding to the torque generated by the first motor, which can be either a motor torque or a resisting torque, and which is called Cmot1. The main shaft 14 also receives a torque that can be transmitted to it through the coupling/decoupling means 13, originating from the second motor 12. This torque is called Cemb. Note that the torque transmitted by the coupling/decoupling means 13 depends on the degree to which this coupling/decoupling means is open or closed. That is, the coupling/decoupling means varies between a position in which it is completely open, in which it transmits no torque, and a position in which it is completely closed, in which it can transmit the maximum torque that it is capable of transmitting, which can correspond to the torque generated by the second motor. In this situation, the rotation speeds of the input and output shafts of the coupling/decoupling means are equal: the two motors are synchronized. The torque transmitted by the coupling/decoupling means is then equal to the difference between the torque provided by the second motor Cmot2 and the torque needed to accelerate or decelerate the inertia associated with this motor. Thus, if $\omega$ is the rotation speed of the motor and Cemb the torque transmitted by the clutch, then: Cemb=Cmot2−Jm2×d$\omega$/dt.

When the coupling/decoupling means is in the process of closing or opening, the maximum torque that it can transmit depends on the degree to which it is open or closed. Also, during this phase—and particularly while closing—the coupling/decoupling means can be in sliding mode, meaning that the rotation speed of the second motor and the rotation speed of the first motor—i.e., the input and output motor rotation speeds of the coupling/decoupling means—can be different. When the coupling/decoupling means is operating in sliding mode, the torque transmitted by the clutch Cemb is equal to the maximum transmittable torque, taking into account the degree to which the coupling/decoupling means is open or closed.

With such a device, in order to change the gearbox ratio, the assembly is controlled as shown in FIG. 2, starting from an initial phase 0 in which the torque supplied by the drive unit to the main input shaft 14 of the gearbox is equal to Cap,h,0, that is, an initial hybrid torque.

Starting at instant $T_1$, when the gearbox ratio begins to change, the torque applied to the main shaft is decreased to a value called the natural deceleration torque Cap,nat, which is the torque such that the torque transmitted by the gearbox is zero. This torque is such that, with the gearbox ratio taken into account, the deceleration of the drive unit corresponds to the natural deceleration that the wheel drive shaft 16 would have if the gearbox were transmitting no torque to the wheel. This natural deceleration torque is reached at instant $T_2$. This first phase is called cancellation. It is followed by a period 2, called synchronization, during which the gear change is carried out. During this phase, we synchronize the pinions, disconnect, synchronize the pinions, and reconnect after having changed the gear ratios, and this second phase ends at instant $T_3$. Following instant $T_3$ and up until instant $T_4$, we recouple the drive unit to the wheel drive shaft, and we increase the torque transmitted to the main shaft to the value set by the supervising computer, which corresponds to the optimal hybrid-mode torque for the main shaft Cap,opt,h. This third phase is called re-engagement. Past instant $T_4$, the drive unit continues to operate, transmitting the new optimal torque just defined to the main shaft. This phase is referenced 4 on the figure.

In order to make the torque applied to the main shaft decrease during the first phase 1, called the cancellation phase, at a certain point, the second motor must be decoupled from the first motor. This decoupling must be performed while following setpoints for torque variations for all of the components of the drive unit, such that no discontinuity is felt in the vehicle's accelerations. Likewise, during phase 3, called the re-engagement phase, at the moment we start to increase the torque applied to the main shaft again, the second motor and the first motor must be recoupled using control laws for the drive unit equipment assemblies in such a way that the vehicle does not experience any discontinuity in its acceleration.

We will now describe the control laws for the various components of the drive unit that enable decoupling in satisfactory conditions.

First, for the period before decoupling begins, we define a) a torque setpoint for the main shaft in initial hybrid mode Cap,c,h, which we will also call the hybrid-mode reference setpoint and b) a torque setpoint for the main shaft in initial decoupled mode Cap,c,1, which we will also call the decoupled-mode reference setpoint, such that these two setpoints produce the same vehicle behavior.

We also determine the natural deceleration torques for the main shaft, in hybrid mode and in decoupled mode Cap,nat,h and Cap,nat,1, which are the torques that correspond to a zero torque transmitted by the gearbox. If $J_1$ is the inertia of the first motor seen from the main shaft, $J_2$ the inertia of the second motor seen from the main shaft, $J_v$ the inertia of the vehicle seen from the wheel drive shaft, Crés the resisting torque to which the wheel is subjected and if $\eta$ is the gearbox ratio, then the natural deceleration torques of the main shaft in hybrid mode and decoupled mode are expressed by the following relations:

natural deceleration torque in hybrid mode:

$$Cap, nat, h = -\frac{1}{\eta} \times \frac{J_1 + J_2}{J_v} \times Cres.$$

natural deceleration torque in decoupled mode:

$$Cap, nat, 1 = -\frac{1}{\eta}\frac{J_1}{J_v} \times Cres.$$

Once these four quantities are determined, we define two variation ramps for torques for the main shaft: a ramp that corresponds to hybrid operating mode, Cap,c,h(t), and a ramp corresponding to decoupled operating mode Cap,c,1(t); these ramps make the torque change respectively from the initial hybrid-mode drive torque for the main shaft to the hybrid-mode natural deceleration torque for the main shaft, and from the initial decoupled-mode drive torque for the main shaft to the decoupled-mode natural deceleration torque for the main shaft between an instant $T_1$ and an instant $T_2$, with the time interval from $T_1$ to $T_2$ being longer than the time $\tau$ during which the coupling/decoupling means is opening.

We define an instant $T'_1$ where the coupling/decoupling means begins to open, such that the time interval between $T'_1$ and $T_2$ is equal to the time $\tau$ during which the coupling/decoupling means is opening. Once instant $T'_1$ is defined, a torque setpoint Cmot1,cons(t) is given to the first motor that makes it change between instant $T_1$ and instant $T'_1$ from the torque setpoint it had before the opening process began to a torque setpoint equal to the decoupled-mode natural deceleration torque of the main shaft Cap,nat,1. Then the torque setpoint for the first motor is maintained at the decoupled-mode natural deceleration torque value for the main shaft throughout and beyond the process of opening the coupling/decoupling means.

During the whole coupling/decoupling process, the setpoint for the second motor Cmot2,cons(t) is adjusted so that the sum of the torque setpoint for the motor 11 and the setpoint for the motor 12 is equal to the hybrid-mode torque setpoint for the main shaft: namely, Cap,h,0 before instant $T_1$, then the ramp Cap,c,h(t) between instant $T_1$ and instant $T_2$.

Between instant $T_1$ and instant $T'_1$, the coupling/decoupling means is kept completely closed. At instant $T'_1$, we begin opening the coupling/decoupling means in such a way that this process is completed at instant $T_2$. The maximum transmittable torque Cemb(t) then drops from the maximum value Cemb,f at instant $T_1$ to zero at instant $T_2$. The first motor is continuously controlled for torque. Until instant $T_2$, the second motor is also controlled for torque. Past instant $T_2$, the second motor, which is no longer transmitting torque to the main shaft, since the coupling/decoupling means is completely open, can be controlled just as well for torque as for speed.

During the whole opening process, the maximum torque transmittable by the coupling/decoupling means is always greater than the torque setpoint to be provided by the second motor Cmot2,cons(t), so that the torque transmitted by the coupling/decoupling means is always equal to the torque provided by the second motor, which remains constantly synchronized with the main shaft. At the end of the opening process, the motors are suddenly decoupled so that the torque transmitted to the main shaft changes abruptly from the value corresponding to the natural deceleration torque in hybrid mode to the natural deceleration torque in decoupled mode.

This sudden jump in torque for the main shaft makes it possible to absorb the impact of the inertia difference seen by the main shaft at the moment of decoupling. That is, as long as the two motors are coupled, i.e., as long as they are synchronized, the inertia produced seen by the main shaft for the drive unit corresponds to the sum of the inertias of the first motor and the second motor, whereas after decoupling, the inertia of the drive unit driven by the main shaft is simply equal to the inertia of the first motor.

We will now describe the coupling process during the re-engagement phase, after the gearbox ratio change.

As in the previous case, we define hybrid-mode and decoupled-mode natural deceleration torques for the main shaft that are identical to the natural deceleration torque defined for the cancellation phase. We also define hybrid-mode and decoupled-mode optimal torque setpoints for the main shaft, targeted after the re-engagement phase after the gearbox ratio change, Cap,c,h and Cap,c,1, respectively, also called the hybrid-mode and decoupled-mode reference setpoints. These target values for the torque setpoint to provide to the main shaft are defined by the supervising computer. As in the previous case, we define ramps for transitioning from the natural deceleration torque to the hybrid-mode or decoupled-mode optimal target torque during the re-engagement period, which takes place between instant $T_3$, when coupling begins, and instant $T_4$, when we reach the optimal torque setpoints for the main shaft. These ramps are called Cap,cons,h($t$) and Cap,cons,1($t$), respectively. To couple the two motors, we maintain a torque setpoint Cmot1,cons(t) for the first motor equal to the decoupled-mode natural deceleration torque at least until instant $T''_3$, the instant at which the torque transmitted to the main shaft is equal to the optimal torque transmitted after re-engagement. Throughout this period, from an instant $T_3$ up to an instant $T'_3$ that precedes instant $T''_3$, the coupling/decoupling means is progressively closed in such a way that the sum of the torque provided by the first motor and the maximum torque transmitted by the coupling/decoupling means is equal to the torque setpoint to transmit to the main shaft, in accordance with the ramp that enables the transition from the natural deceleration torque to the targeted optimal torque in decoupled mode Cap,cons,1($t$). During this period, the second motor is controlled for speed in such a way that at instant $T'_3$, the rotation speed of the second motor is equal to the rotation speed of the main shaft; this corresponds to a synchronization using a tangential-projection speed trajectory. At instant $T'_3$, the coupling/decoupling means is suddenly closed, so that from this instant on, the second motor and the first motor are completely coupled. Simultaneously, we switch the control mode for the second motor from speed-control mode to torque-control mode, and we make the second motor follow a torque variation setpoint Cmot2,cons(t) such that the sum of the torque provided by the second motor and the torque provided by the first motor follow the torque transition law for the main shaft from the natural deceleration torque value to the targeted optimal torque value after coupling, in accordance with the hybrid-mode law of variation Cap,cons,h(t). Past instant $T''_2$, we continue to vary the torque of the first motor and the torque of the second motor so that the torque transmitted to the main shaft remains constant and corresponds to the targeted hybrid-mode value for the main shaft, and so that the torque provided by the first motor and the torque provided by the second motor progress toward the optimal values for these two motors that result in the optimal use of the drive unit.

Due to this operating mode, at instant $T'_3$, which corresponds to the moment the coupling/decoupling means suddenly closes, i.e., the moment we change from a decoupled operating mode to a coupled operating mode, the torque setpoint for the main shaft changes suddenly from the value that corresponds to the decoupled operating mode to the value corresponding to the hybrid operating mode, which makes it possible to absorb the effects of the change from the sudden variation in inertia that the main shaft must incur.

With such control laws for the drive units to govern decoupling during the cancellation phase and coupling during the re-engagement phase, the gearbox ratio change occurs in a user-transparent manner.

The invention claimed is:

1. Method for controlling the coupling and the decoupling of the first motor and the second motor of a parallel hybrid drive train of the type comprising a first motor that drives a main input shaft of a gearbox, a second motor, and a coupling/decoupling means for the second motor and the first motor, maneuverable between an open position and a closed position to make it possible to change the gearbox ratio when the drive train is operating in hybrid mode, according to which the drive train is controlled so as to decouple the second motor and the first motor, then to change the gearbox ratio, and to recouple the second motor and the first motor, wherein control laws are used for the drive unit such that during coupling and during decoupling, the torque setpoint for the main shaft has a discontinuity selected so as to offset the difference between the inertia carried by the main shaft when the second motor is coupled to the first motor and the inertia carried by the main shaft when the second motor is decoupled from the first motor in order to avoid any sudden variation in acceleration of the main shaft driven by the drive unit at the moment of decoupling or coupling, and wherein a reference torque setpoint is defined for the drive unit, to be sent to the main shaft when the two motors are coupled, as well as a reference torque setpoint to be sent to the main shaft when the two motors are decoupled; based on the resisting torque to which the main shaft is subjected and the inertias it must carry when the motors are coupled and decoupled, a natural deceleration torque is defined for the drive unit when the motors are coupled, as well as a natural deceleration torque when the motors are decoupled; a first transition law is defined to govern the transition, for coupling, from the reference torque to transmit to the main shaft when the motors are coupled to the natural deceleration torque when the motors are coupled, and the reverse for decoupling; a second law is defined to govern the transition, for coupling, from the reference torque to transmit to the main shaft when the motors are decoupled to the natural deceleration torque when the motors are decoupled, and the reverse for decoupling; and during coupling or decoupling, the drive unit is controlled so as to transmit to the main shaft a torque consistent with the transition law that corresponds to the initial operating mode of the drive unit, up to the moment when the operating mode of the drive unit changes, and then the drive unit is controlled so as to transmit to the main shaft a torque consistent with the transition law that corresponds to the target operating mode of the drive unit.

2. Method according to claim 1, wherein for decoupling, the moment the drive unit changes operating modes is when the coupling/decoupling means finishes opening, and for coupling, the moment the drive unit changes operating modes is when the coupling/decoupling means finishes closing.

3. Method according to claim 1, wherein the first motor is controlled continuously for torque; the second motor is controlled for torque when it is coupled, and controlled for speed when it is decoupled or in the process of coupling; and the coupling/decoupling means is controlled for torque in such a way that the torque transmitted to the main shaft—which is equal to the sum of the torque of the first motor and the maximum torque transmittable by the coupling/decoupling means when the second motor is not coupled, or the torque of the second motor when the second motor is coupled—is equal at each instant to the torque setpoint for the main shaft defined for the transition from coupled to decoupled, or vice versa.

4. Method according to claim 3, wherein for decoupling, during a first period in which the two motors are coupled, the torque setpoint of the first motor is reduced to the value corresponding to the natural deceleration torque when the motors are decoupled; then the torque setpoint for the first motor is maintained, and the coupling/decoupling means begins to open; the coupling/decoupling means is opened while the second motor is controlled so that the torque transmitted to the main shaft follows the law corresponding to the motor-coupling process.

5. Method according to claim 3, wherein to carry out the coupling process, the torque setpoint of the first motor is maintained, and the coupling/decoupling means begins to close and it closes gradually; simultaneously, the second motor is controlled for speed to make the coupling/decoupling means synchronize tangentially, and as soon as the tangential synchronization occurs, the torque setpoint for the main shaft is switched from the law for the decoupled motors to the law for the coupled motors, and the control mode of the second motor is switched from speed-control mode to torque-control mode.

6. Method according to claim 1, wherein the first motor is an electrical machine, the second motor is a heat engine, and the coupling/decoupling means is a controlled clutch.

7. Method according to claim 6, wherein the drive unit is a hybrid drive train of a motor vehicle.

8. Hybrid drive train of the type that includes a first motor, a second motor and a coupling/decoupling means, characterized in that it has a control means that implements the method according to claim 1.

9. Drive train according to claim 8, which drives the gearbox of an automobile on which it is mounted.

* * * * *